US008627344B2

(12) United States Patent
Tandriono et al.

(10) Patent No.: US 8,627,344 B2
(45) Date of Patent: Jan. 7, 2014

(54) METHODS AND APPARATUSES FOR USER INTERFACE MANAGEMENT

(75) Inventors: Setiono Tandriono, Sunnyvale, CA (US); Parthasarathy Ramachandran, Newark, CA (US); Muralidhara Varmaraja, Fremont, CA (US); Yong Li, Fremont, CA (US); Sharad Mitra, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1584 days.

(21) Appl. No.: 11/013,607

(22) Filed: Dec. 15, 2004

(65) Prior Publication Data
US 2007/0226613 A1  Sep. 27, 2007

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................... 719/328; 719/320

(58) Field of Classification Search
USPC ...................................................... 719/320
See application file for complete search history.

(56) References Cited

U.S. PATENT DOCUMENTS

| 6,570,578 | B1 * | 5/2003 | Smirnov et al. | 345/629 |
| 6,826,726 | B2 * | 11/2004 | Hsing et al. | 715/234 |
| 6,973,626 | B1 * | 12/2005 | Lahti et al. | 715/763 |
| 7,020,882 | B1 * | 3/2006 | Lewallen | 719/328 |
| 7,222,306 | B2 * | 5/2007 | Kaasila et al. | 715/801 |
| 7,707,563 | B2 * | 4/2010 | Wei | 717/140 |
| 7,765,255 | B2 * | 7/2010 | Cherdron et al. | 709/203 |
| 8,136,109 | B1 * | 3/2012 | Birdeau et al. | 717/175 |
| 2002/0069246 | A1 * | 6/2002 | Gideon | 709/203 |
| 2002/0120716 | A1 * | 8/2002 | Raghunathan et al. | 709/219 |
| 2002/0122070 | A1 * | 9/2002 | Watanabe | 345/810 |
| 2003/0145042 | A1 * | 7/2003 | Berry et al. | 709/203 |
| 2004/0123239 | A1 * | 6/2004 | Roessler | 715/513 |
| 2004/0230903 | A1 * | 11/2004 | Elza et al. | 715/513 |
| 2005/0289156 | A1 * | 12/2005 | Maryka et al. | 707/100 |
| 2006/0200535 | A1 * | 9/2006 | Moser | 709/217 |
| 2007/0245232 | A1 * | 10/2007 | Wake et al. | 715/513 |

OTHER PUBLICATIONS

Mike Padilla, "Create rich client apps with the DOM", Feb. 17, 2004, IBM, DevelperWorks, pp. 1-8.*
Arnaud Le Hors, et al. "Document Object Model (DOM) Level 3 Core Specification". Version 1.0, W3C Recommendation, Apr. 2004. p. 1-216.

* cited by examiner

*Primary Examiner* — Emerson Puente
*Assistant Examiner* — Kimbleann Verdi
(74) *Attorney, Agent, or Firm* — Campbell Stephenson LLP

(57) ABSTRACT

A data driven, no-refresh, high-interactivity user interface framework, which can be used in (or with) web browsers to provide user interface for accessing product and service configuration through network connection. For example, the user interface can be used with web-based customer order management or product configurator. In one embodiment, the user interface presented as a web document is updated using Document Object Model (DOM) to avoid refreshing. Updates to the user interface are driven by the data managed by the user interface. An event queue for user actions to be dispatched to the server is provided to improve usability of the user interface. A user interface level application program interface is provided for external applications/modules to improve configurability.

19 Claims, 7 Drawing Sheets

METHODS AND APPARATUSES FOR USER INTERFACE MANAGEMENT

TECHNOLOGY FIELD

At least some embodiments of the present invention relate to user interfaces presented as web documents in a web browser, and more particular to interactivity of such user interfaces when server side processing is involved.

BACKGROUND

Developed and standardized by the International Organization for Standards (ISO) in 1986, Standard Generalized Markup Language (SGML) is a system for organizing and tagging elements of a document. SGML specifies the rules for tagging elements. The tags can be interpreted to format the tagged elements. Different programs may interpret the tags differently.

Similar to SGML, HyperText Markup Language (HTML) is a markup language used to create documents with hyperlinks, or links, that are portable from one platform to another. Hyperlinks allows one to jump from one document to another on the network, such as Internet, in a non-sequential way. Hyperlinks allows documents to be linked in a complex web of associations, forming the World Wide Web. Typically, hyperlinks are specified using Uniform Resource Locator/Universal Resource Locator (URL), which points to a specific location on the network for the retrieval of a web page.

A web browser, such as Internet Explorer or Netscape Navigator, provides an interface to the World Wide Web. A web browser presents the web documents and accepts user inputs. When a link is selected, the web browser follows the link to retrieve the corresponding web document and present the document. A sophisticated web browser can present web documents of many different formats.

HyperText Markup Language (HTML) supports the submission of data from the web browser to a web server, which typically communicates with web browsers in HyperText Transfer Protocol (HTTP) over a network connection. A web browser may also retrieve web documents using other communication protocols.

For example, a web page may contain a number of user interface elements specified in HTML, such as text entry boxes, radio buttons, checkboxes, selection boxes, buttons, etc. A user can interact with the web browser to provide user data to the corresponding user interface elements. The web page can have one or more buttons, which when pressed cause the web browser to send user data, collected by the web browser for the web page, to the web server. In response, the web server can present a new web page in view of the submitted user data.

In this way, a user may interact with application programs running on the server through the use of web browsers and web servers. On the server side, the application programs communicate with the web server to present data and/or collect user input. The web pages rendered in the web browser can be viewed as the user interfaces of the application programs running on the server.

Dynamic HTML combines HTML, style sheets, and scripts to make web pages more interactive. Cascading Style Sheets (CSS) allow web developers to control the style and layout of multiple web pages in a consistent way. Cascading Style Sheets provide templates for the appearance of one or more HTML elements. Scripts allow web developers to create programs running in the web browser for the associated web page to provide user interaction.

For example, a script may be used to check if the data entered by a user is of a correct type and inform the user when an error is detected. The script can be used to avoid the web browser sending erroneous data to the server and the server responding back a web page pointing out the error(s) which may be easily detected using the script in the web browser.

Extensible Markup Language (XML) is a dialect of SGML. XML allows designers to create their own customized tags, enabling the definition, transmission, validation, and interpretation of data between applications and between organizations. XML has been designed for ease of implementation and for interoperability with both SGML and HTML.

Document Object Model (DOM) is an Application Programming Interface (API) for documents, such as HTML and XML documents. DOM defines the logical structure of documents and the way a document is accessed and manipulated. For example, XML may be used to present data as a document; and DOM can be used to manage the data.

Using DOM, programmers can build documents, navigate their structure, and add, modify, or delete elements and content. Most elements found in an HTML or XML document can be accessed, changed, deleted, or added using DOM, such as graphics, text, headlines, styles, etc.

DOM is designed to be used with any programming language, such as Java, JavaScript, VBScript, ECMAScript (an industry-standard scripting language based on JavaScript and JScript), etc.

A hosting implementation of DOM provides an implementation of the API in accordance with DOM specification so that a client application of DOM can use the interface. Some examples of hosting implementations of DOM are browsers, editors and document repositories.

A client application of DOM uses the hosting implementation of DOM to manipulate documents. Some examples of client applications of DOM are scripts within an HTML or XML document.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
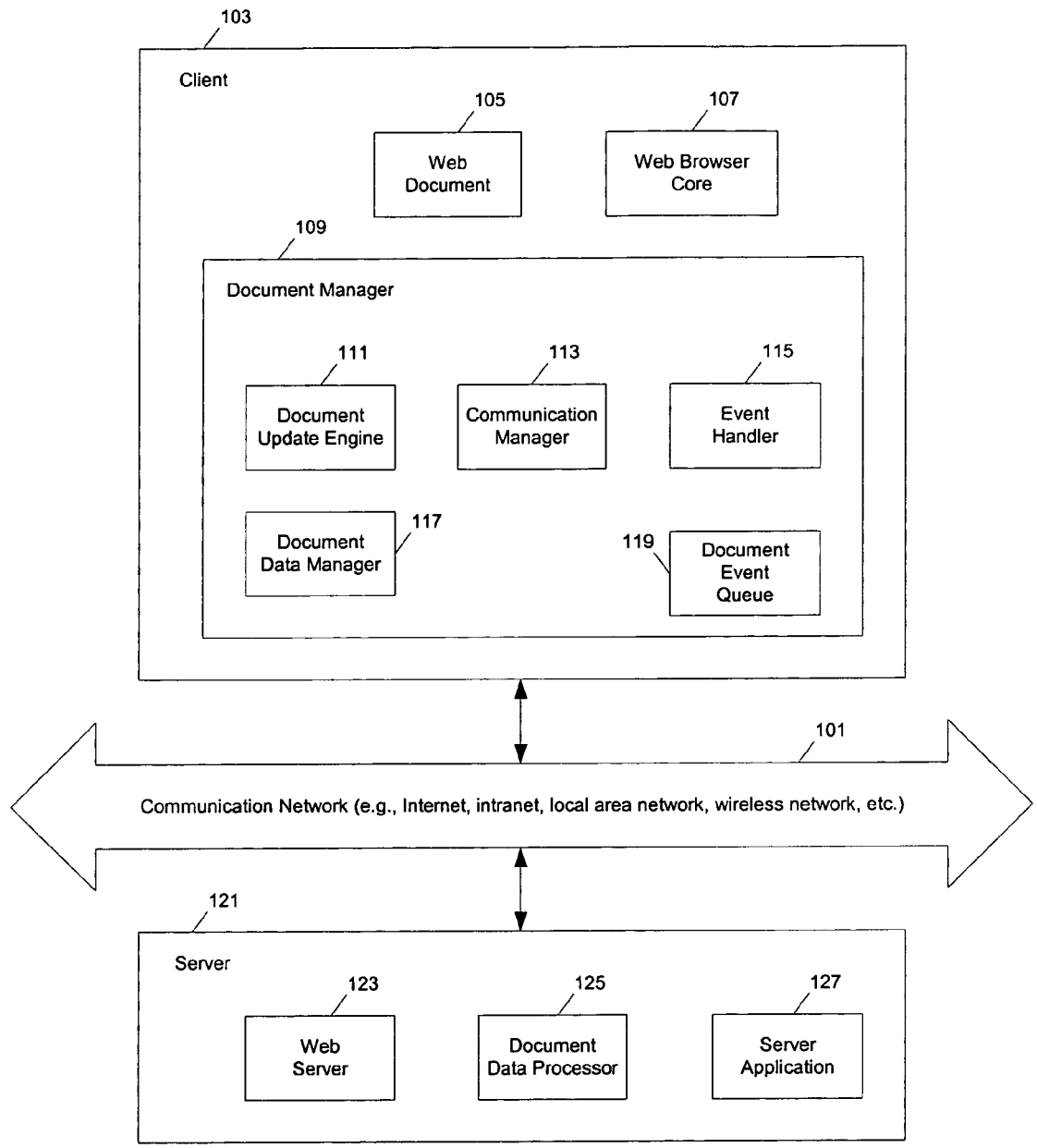
FIG. 1 illustrates a user interface system according to one embodiment of the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Typically, a web server sends a web page to a web browser to present a user interface which can be used to present data and/or collect data, such as order options or product/service configurations. When the user selects a particular option, the user interface may need modifications.

For example, when a user selects a particular color for a car, it may be determined that certain options may not available for cars of the particular color; and certain other options may become available for the cars of the particular color. A friendly user interface evolves and changes as more information is received from the user.

Typically, the web page is modified at the server; and an updated version of the web page is sent to the web browser to show the updated user interface. The web browser reloads or refreshes the entire web page in the web browser.

The refresh process takes time to download the entire updated web page and to re-render the web page, even though only a small portion of the web page is updated.

Screen refresh can be uncomfortable to the user and undesirable and can degrade the usability of the user interface.

The delay in the refresh process may cause long user wait time after user interaction. Generating the entire updated web page increases the workload at the server; and downloading the entire updated web page generates more network traffic between the client and the server.

One embodiment of the present invention provides a data driven, no-refresh, high-interactivity user interface framework, which can be used in (or with) web browsers to provide user interface for accessing product and service configuration through network connection. For example, the user interface can be used with web-based customer order management or product configurator.

In one embodiment of the present invention, the user interface can be partially updated without refreshing the entire web document in the web browser, which improves usability of the user interface. Further, eliminating refresh can dramatically reduce the network traffic associated with downloading updated web pages which show the updated user interfaces.

In one embodiment of the present invention, a client application of DOM uses a hosting implementation of DOM in the web browser to dynamically update and modify the web document. The web document is presented in the web browser as a user interface to access the server application. In one embodiment, the client application includes a user interface rendering engine, which uses DOM to implement changes in the user interface.

In one embodiment of the present invention, an application program interface is provided to access the user interface rendering engine. The application program interface is at the user interface level so that custom programs can be easily developed to customize user interfaces that are presented as web documents in the web browser.

Thus, for example, one can develop custom logic functions to manipulate the web document at the user interface level. According to the user interface level requests received through the application program interface to the user interface rendering engine, the user interface rendering engine uses DOM to modify the web document and implement the user interface.

The application program interface to the user interface rendering engine increases the configurability of the user interface. To customize a user interface, one can use custom modules to adjust the appearance and/or behavior of the user interface using the user interface level API. Further, external applications can access the user interface (UI) layer API to extend the functionality of the user interface rendering engine.

In one embodiment of the present invention, the user interface rendering engine is driven by data from the server. The server specifies the data for the user interface, such as the data to be presented or to be collected via the user interface. The user interface rendering engine determines the modifications to a web document to implement the user interface for the data. Thus, the user interface is data driven.

In one embodiment, instead of generating the user interface modifications at the server and sending the user interface modification to the web browser for implementation after user interaction, the server sends increment data updates for the user interface. The user interface rendering engine running on the client computer, on which the web browser is running, determines the modifications to the web document to implement a user interface that is suitable for the data.

In one embodiment, the data sent from the server includes the list of items for which user data will be collected and option sets for selection by the user. The data may further include default values and/or previously collected user data. In response to user interaction, increment data updates are sent from the server. For example, instead of sending the entire list of items, only changes to the list is sent to reduce the amount of data that is transmitted over the network.

When the server sends the increment data updates to the user interface rendering engine, the user interface rendering engine determines the modifications to the user interface from the increment data updates.

In one embodiment of the present invention, a user interface framework uses an event queue to manage user events that require server side processing so that the browser do not have to wait for the response from the server before accepting and performing further user inputs. A user input action may require certain client side processing and response and certain server side processing and response. The use of an event queue improves the responsiveness of the user interface, since the user does not have to wait for the server side response before performing next input operation.

In one embodiment of the present invention, the client application running in (or with) a web browser includes: a DOM based user interface (UI) update engine, a user interface (UI) rendering engine, a local data cache, an event handler, and a communication manager. In one embodiment, the client application further includes user interface level application program interfaces for one or more custom modules to customize user interfaces which are presented as web pages in the web browser.

In one embodiment, a user interface (UI) update engine updates web documents to implement user interface through DOM. A user interface rendering engine renders user interface through the user interface update engine according to the data to be managed by the user interface. An event handler traps events from the web browser and queues and dispatches events to a server for processing. A communication manager manages communication with a remote server for HTML stream and increment data updates. A local data cache, separate from the typical browser cache, maintains the data managed by the user interface that is presented in the form of a web document.

In one embodiment, the DOM based UI update engine communicates with the event handler to perform client side processing of user actions and performs DOM updates. The UI rendering engine performs UI control painting and delegates operations to the DOM update engine. The event handler queues user actions and dispatches the user actions for processing. The communication manager manages both HTML and data channels where data are serialized into a format that suitable for network transmission.

In one embodiment, the client side modules are implemented using scripts executable in the web browser. Further, in one embodiment, user interface level application program interfaces are provided for customization modules which can be used to custom configure the user interface presented as a web document. For example, the user interface appearance and behavior can be configured through the use of custom scripts (e.g., JavaScript programs). Thus, the configurability of the user interface presented as a web document is improved according to one embodiment of the present invention.

In one embodiment, the server side includes: visible frame, hidden frames and user interface service. The visible frame uses template cache and placeholders for DOM to generate HTML documents. The hidden frames serve as conduit for UI service to client UI framework. The UI service maintains UI information and control cache to provide increment update services, such as determining data to be displayed, determining increment changes for configuration instance, handling methods invoked from the client side, etc.

FIG. 1 illustrates a user interface system according to one embodiment of the present invention. In FIG. 1, a server system (121) includes a web server (123) and a server application (127). The web server (123) serves as a gateway for the server application (127). Remote clients can access the server application (127) through visiting the web server (123) using a web browser and a communication network (101), such as Internet, intranet, local area network, wireless network, etc.

The server system (121) may be one computer system, or a set of computers interconnected with network connections, such as a local area network.

In one embodiment, the user interfaces for the server application (127) are presented as web documents using the web server (123). The server system (121) further includes a document data processor (125), which processes the document data for a user interface that is presented as a web document. In one embodiment, document data includes data indicating data items to be collected, data values to be presented, options from which a user may select from, etc.

For example, according to currently collected data values the document data processor can determine whether an additional data item needs to be collected, whether an option becomes unavailable, whether available options for a parameter is changed, etc. Such data changes can lead to modifications to the user interface that is presented as the web document. In one embodiment, the modification to the user interface is determined using the document manager (109) running in the client system (103).

In one embodiment, the client system (103) includes a web browser core (107), which includes the functionality of a typical web browser, and supports at least HTML documents. The web browser core (107) renders the web document (105), which is presented as the user interface for accessing the server application (127). In one embodiment, the web browser core is in a web browser, such as Internet Explorer or Netscape Navigator.

In one embodiment of the present invention, the client system (103) further includes a document manager (109). The document manager (109) can manipulate the web document (105) rendered by the web browser core (107). Thus, the document manager (109) may modify the web document (105) to update the user interface without refreshing the entire web document.

In one embodiment, the document manager (109) includes a document update engine (111), which can access the web document (105) for modifications. The document manager (109) further includes a document data manager (117) which can determine the changes to the document data for the web document (105). For example, when the user provides new data values, the document data manager (117) can determine the changes with respect to the data that have been previously sent to the server so that only the increment update portion is sent to the server. Sending the increment update avoids unnecessary network traffic for data that have been previously sent to the server.

In one embodiment, the document manager (109) further includes a communication manager (113) which supports data communication between the document manager (109) and the server system (121). For example, the communication manager (113) facilitates the transmission of increment updates for the document data to and from the document data processor (125) in a data channel (e.g., through remote procedure calls, or an HTTP transaction). In one embodiment, the communication manager (113) further controls an HTML stream for a user interface channel. For example, when a different user interface is to be loaded, the HTML stream can be used to load information for the new user interface for the document update engine (111).

In one embodiment, the document manager (109) further includes an event handler (115) which manages a document event queue (119). Some events can need the processing at the document manager (109) and the processing at the server system (121). When an event needs the processing at the server system (121), the document event is queued in the document event queue for transmission to the server system (121). Thus, the document manager (109) does not have to hold off the processing of further events before the response from the server system is received. This can significantly increase the responsiveness of the user interface.

In one embodiment, when the user moved from one field to another in the user interface, the user input event causes the document manager (109) to validate the data in the field. When the data is changed, the data may be sent to the server system (121) for storage and for further processing by the document data processor (125) (e.g., determining changes to document data), which can lead to updates in the user interface.

In one embodiment, the document data processor (125) sends increment updates for the document data to the document manager, in view of increment updates received from the document manager (109). The increment updates sent from the document data processor (125) drive the user interface changes. The document update engine (111) modifies the web document (105) without refreshing the web document in the web browser. For example, a user interface element can be added into, or deleted from, the web document without the web browser core (107) re-rendering the entire web document.

In one embodiment of the present invention, the document manager (109) is implemented using scripts within the web document (105). For example, in one embodiment of the present invention, JavaScript is used to implement the client application of DOM for the user interface framework of the present invention. A JavaScript program runs in the web browser to manipulate the web document (105) through the host implementation of DOM on the web browser (e.g., web browser core 107). JavaScript is supported on most variety of browsers; and many popular web browsers, such as Internet Explorer and Netscape Navigator, support DOM. Alternatively, Java, VBScript or ActiveX can also be used to implement the client application of DOM for the client side of the user interface framework.

Figure 2:
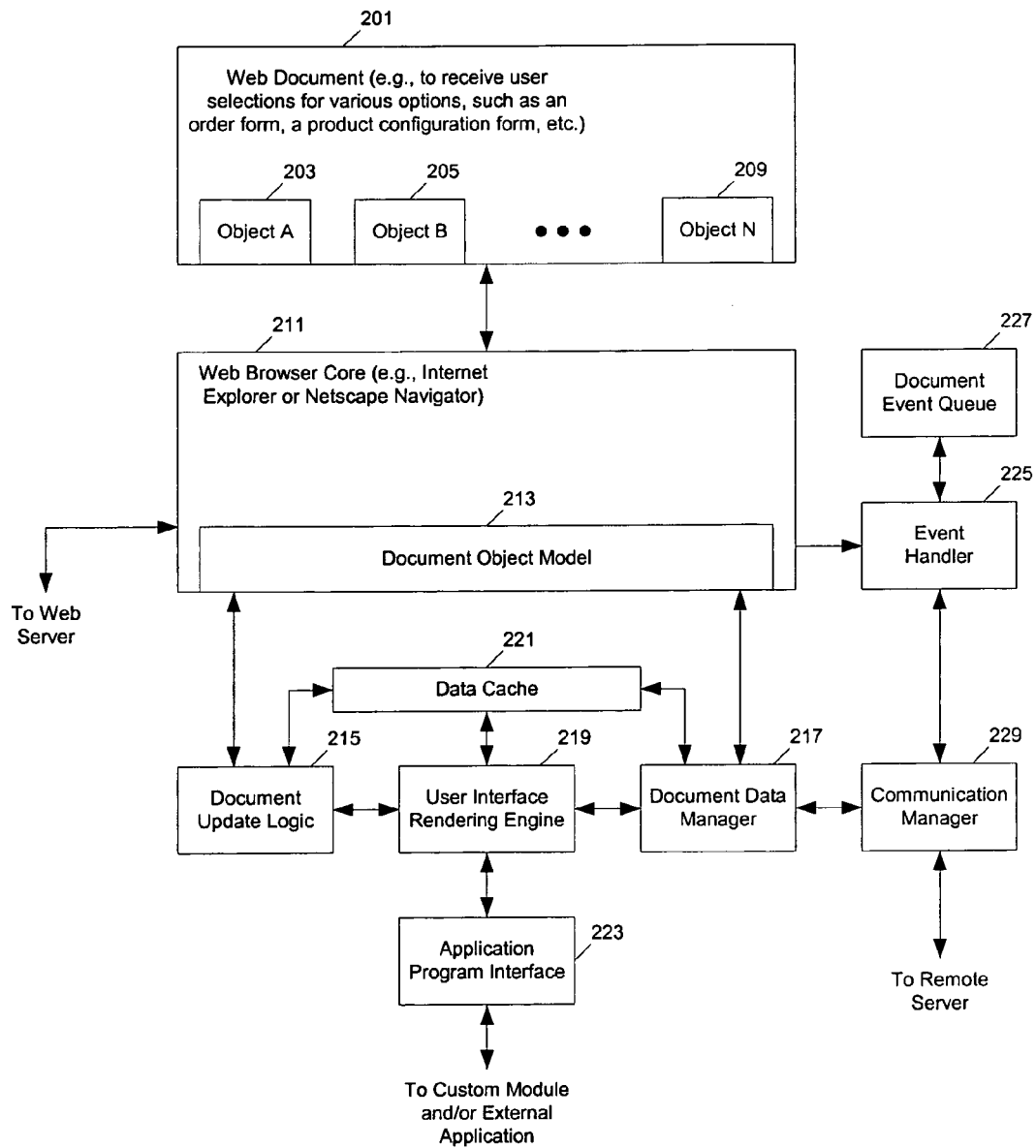
FIG. 2 illustrates a client side implementation of a user interface system according to one embodiment of the present invention.

FIG. 2 illustrates a client side implementation of a user interface system according to one embodiment of the present invention.

In FIG. 2, a web browser core (211), such as Internet Explorer or Netscape Navigator, renders a web document (201), which may be used to receive user selections for various options, such as an order form, a product configuration form, etc. The web document (201) includes various objects (e.g., 203, 205, . . . , 209), which can be accessed by an application program via an implementation of document object model (213).

In FIG. 2, document update logic (215) uses the document object model (213) to update the web document (201) maintained by the web browser core (211). A document data manager (217) uses the document object model (213) to obtain the user data from the web document (201). A data cache (221) is maintained so that increment changes in user data can be determined from comparing the data in the data cache (221) and the data retrieved from the web document via the document object model (213).

In one embodiment, a user interface rendering engine (219) directs the document update logic (215) to implement user interfaces in the form of the web document (201). The user interface rendering engine (219) is typically data driven. For example, when an increment update for document data is received from the remote server via the communication manager (229), the user interface rendering engine (219) determines the modifications to the user interface and implements the user interface through modifying the web document using the document update logic (215).

In one embodiment, an event handler (225) receives user input events from the web browser core (211). For server processing, the events are queued in a document event queue (227), which is separate from any event queue maintained by the web browser core (211). The event handler (225) dispatches the events in the queue (227) to the remote server using the communication manager (229).

In one embodiment, the communication manager (229) uses remote procedure calls for the communication of document data and HTML stream for the user interface specification.

In one embodiment, an application program interface (223) to the user interface rendering engine is provided. Using the application program interface (223), a custom module and/or external application can be used to customize the behavior of the user interface. The application program interface (223) shields the details of document object model (213) from the developers of custom modules/programs so that the developers can focus on the user interface, instead of the web document.

Figure 3:
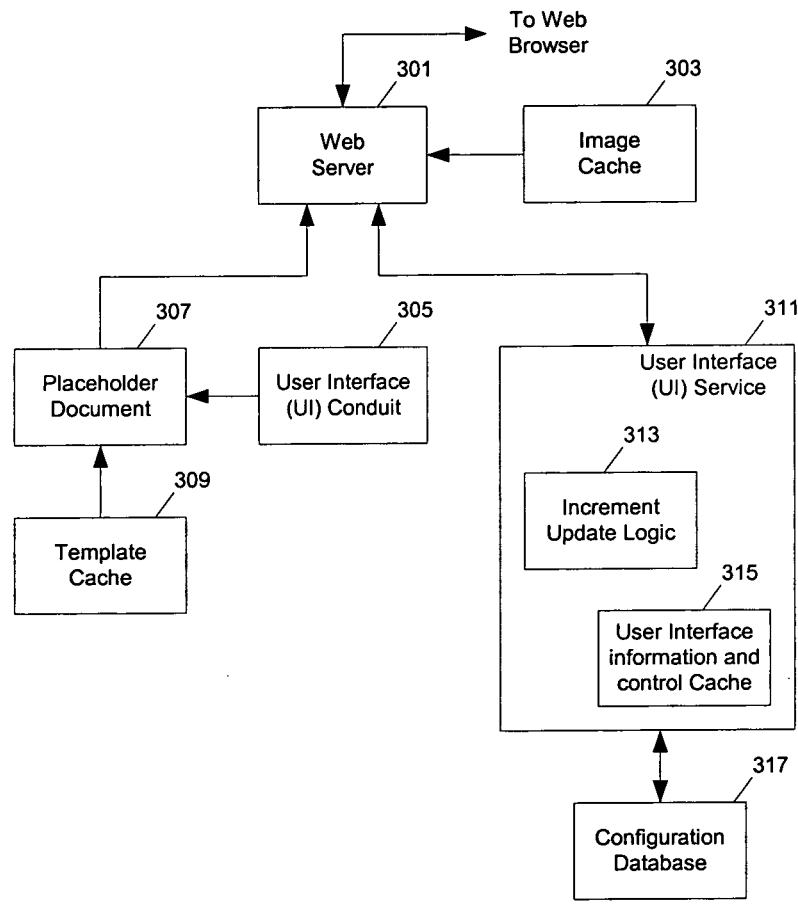
FIG. 3 illustrates a server side implementation of a user interface system according to one embodiment of the present invention.

FIG. 3 illustrates a server side implementation of a user interface system according to one embodiment of the present invention.

In FIG. 3, a web server (301) communicates with web browsers to send the web documents that represent the user interfaces for the configuration database (317). An image cache (303) is used to allow fast access to graphics, icons, etc. A template cache (309) is used to provide a placeholder document (307) which is typically an HTML document. The placeholder document (307) allows the user interface conduit (305) to be loaded into an invisible frame of the web document served. The user interface conduit (305) may include user interface rendering engine and information specific for the definition of particular user interfaces. The placeholder document (307) allows various user interface elements to be inserted into various locations.

In one embodiment, a user interface service (311) includes increment update logic (313) and user interface information and control cache (315). The user interface information and control cache (315) contains information about the user interface as presented at the web browser. The increment update logic (313) determines increment changes to document data based on the collected user input data, the user interface information and control cache (315), and the configuration database (317).

Figure 4:
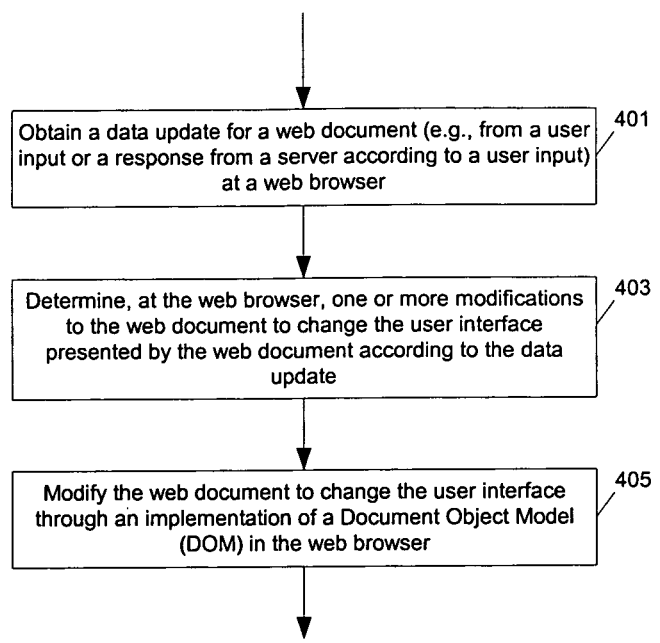
FIG. 4 shows a data driven method to modify user interfaces according to one embodiment of the present invention.

FIG. 4 shows a data driven method to modify user interfaces according to one embodiment of the present invention. Operation 401 obtains a data update for a web document (e.g., from a user input or a response from a server according to a user input) at a web browser. The data update can be a change in the list of data items to be collected and/or to be presented by the web document as a user interface, a change in available options, etc. Operation 403 determines, at the web browser, one or more modifications to the web document to change the user interface presented by the web document according to the data update. Operation 405 modifies the web document to change the user interface through an implementation of a Document Object Model (DOM) in the web browser. The increment changes in the data to be collected or presented by the user interface drive the increment changes in the user interface.

Figure 5:
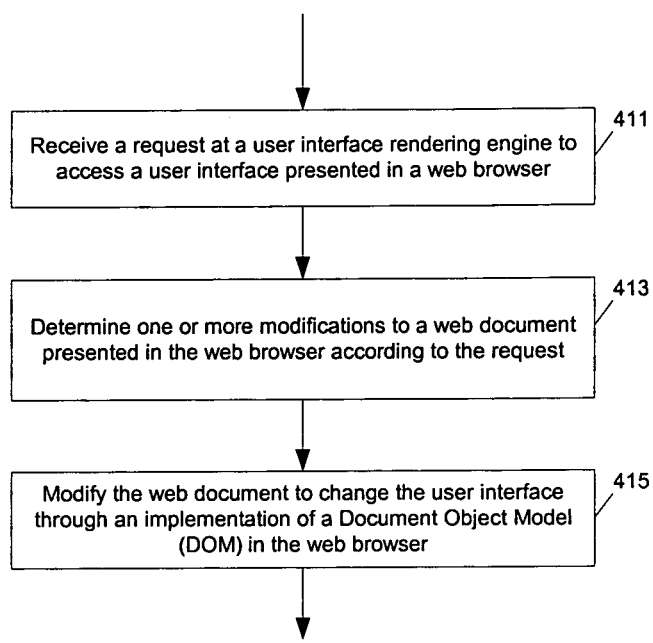
FIG. 5 shows a method to provide application program access to user interfaces according to one embodiment of the present invention.

FIG. 5 shows a method to provide application program access to user interfaces according to one embodiment of the present invention. Operation 411 receives a request at a user interface rendering engine to access a user interface presented in a web browser. The user interface is presented as a web document. The request is at the user interface level. The user interface rendering engine shields the request from the details of the web document. Operation 413 determines one or more modifications to a web document presented in the web browser according to the request. Operation 415 modifies the web document to change the user interface through an implementation of a Document Object Model (DOM) in the web browser. The user interface rendering engine provides a user interface level application program interfaces (API) for custom models, which can send the requests at the user interface level to customize the user interface rendered as a web document in the web browser.

Figure 6:
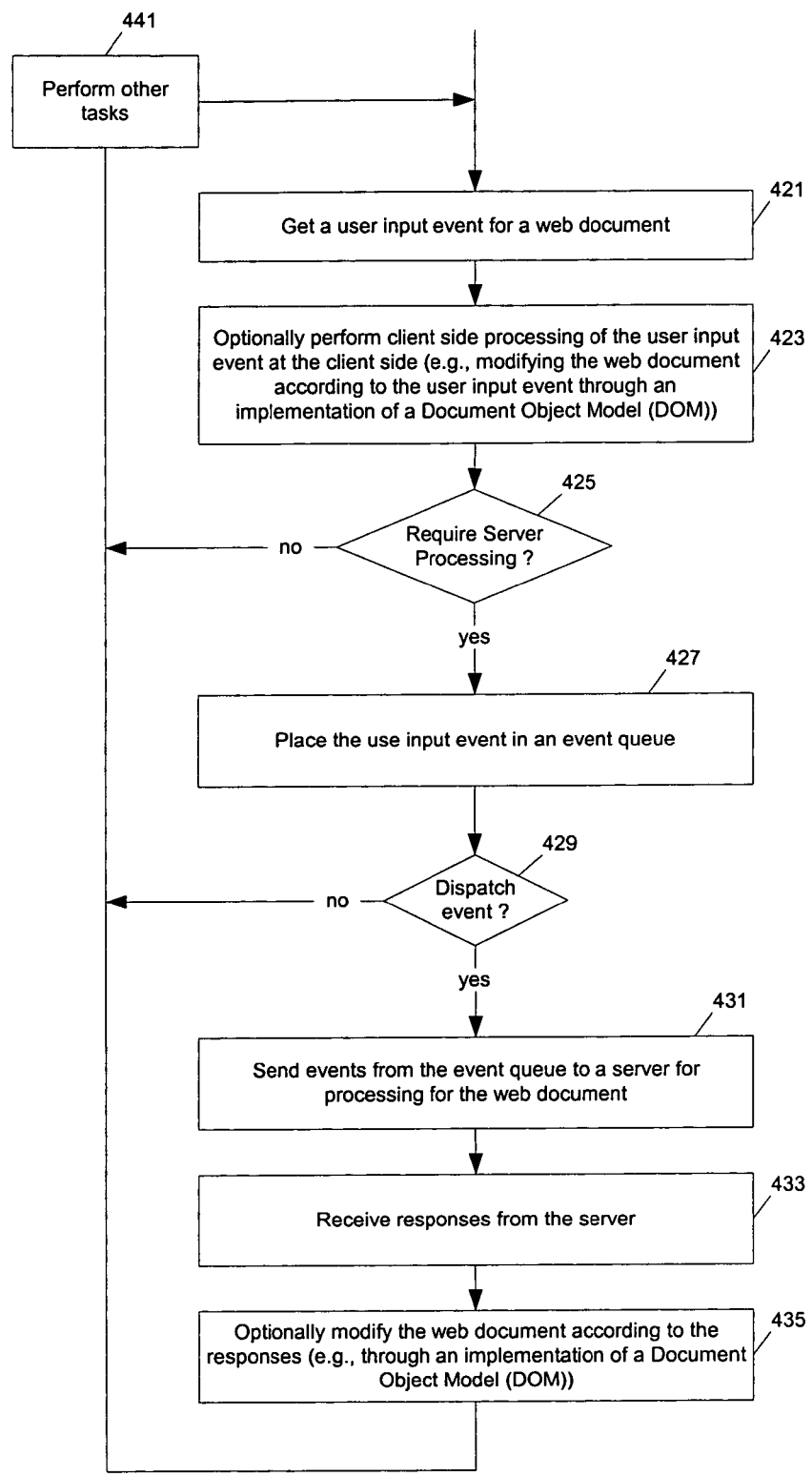
FIG. 6 shows a method to handle events for updating user interfaces according to one embodiment of the present invention.

FIG. 6 shows a method to handle events for updating user interfaces according to one embodiment of the present invention. After operation 421 gets a user input event for a web document, operation 423 optionally performs client side processing of the user input event at the client side (e.g., modifying the web document according to the user input event through an implementation of a Document Object Model (DOM)). If operation 425 determines that the user input event requires server processing, operation 427 places the use input event in an event queue. For example, when the user leaves one input field and enters another input field without explicitly requesting committing the data, the client side user interface may implicitly commit the data received in the input field if the data in the input field is changed. To commit the data, the increment change is sent to the server for storage. Based on the increment change, the server may further determine whether there is any change in data for the user interface.

When operation 429 determined that events can be dispatched for server processing (e.g., when the communication channel is available, a response for a previous request is received, etc.), operation 431 sends events from the event queue to a server for processing for the web document. Operation 433 receives responses from the server. Operation 435 optionally modifies the web document according to the responses (e.g., through an implementation of a Document Object Model (DOM)). For example, if the response from the server indicates a change in the data to be collected or presented by the user interface, the web document is modified to change the user interface accordingly.

If temporarily an event cannot be dispatched to the server for processing, operation 441 performs other tasks; and further user input events can be accepted for client side processing (e.g., operations 421-423). For example, an event may not be dispatched temporarily to the server because the communication manager is expecting a response for a previous event from the server or the network connection is temporarily unavailable.

While the communication manage is dispatching a previous event and expecting a response from the server, operations 421-429 can be performed for subsequent events so that the user interface appears to be responsive to the user inputs.

For example, the user may fill out a first data entry and move to other data entries. When the communication manager sends the data value collected for the first data entry for validation, for implicit commitment into a database or a server side cache, and for the determination of any increment changes to the data for the user interface, the user is free to move into other data entries and provide data values or selections. Thus, the user is allowed to enter data in a way asynchronous with the server side processing of the collected data.

If the data value for the first data entry causes changes to data for the user interface, the server then sends the increment changes to the communication manager, which causes the user interface rendering engine and the user interface update logic to change the user interface. The user interface can be changed through modifying the web document using DOM.

For example, when the data value for the first data entry opens a further option for the configuration of the product, the server indicates to the communication manage that an additional data item is to be collected. Thus, the user interface rendering engine and the user interface update logic inserts an additional data entry field to collect data value for the additional data item. Further, a customization module can use the user interface level API to the user interface rendering engine to customize the appearance of the additional data entry field.

If, according to the data value for the first data entry, the server sends a message indicating that a second option is no long available, the user interface rendering engine and the user interface update logic remove the data entry field for the second option.

A system according to embodiments of the present invention can significantly improve the performance of the user interface in response time and scalability. A quick response time results from the reduced time in generating the update information at the server, transmitting the information over the network, and updating the web document without rerendering the entire web document in the web browser. Since the server sends the increment data update, instead of the entire update web page, a given capacity of the server and the network can accommodate more users.

For example, consider a configuration form that has 10 option items which require server side processing. Loading the configuration form may take 60 seconds; and finally submitting the completed form and receiving a confirmation page may take 35 seconds. In a traditional approach where the entire refreshing web page is sent for each data entry, each data entry operation can take 30 seconds. Thus, completing the configuration form can take 395 seconds in total.

When the change in the user interface is driven by the increment data change, the time to transmit the server response can be significantly reduced. For example, the time for each data entry operation may be reduced to only 1 second, while the time for loading the configuration form and submitting the complete from may be about the same as the traditional approach. Thus, completing the configuration form using a user interface framework according to one embodiment of the present invention may take only 105 seconds.

Thus, the efficiency of an operator employed to filling out the configuration form can be significantly increased. Certain businesses have full time operators employed to fill out configuration forms using web browsers, the improved efficiency can reduce cost and improve productivity significantly.

In one embodiment of the present invention, a user interface level API for external applications and modules increases configurability of the user interface system. External business logic/service call can be implemented. In one embodiment, the user interface framework at the client side is implemented using JavaScript; and JavaScript programs can be used to configure the user interface that is presented as a web document, allowing more control on user interface rendering. The user interface level API further allows configurable event handling.

Minimal screen refresh increases usability. Since the web document is not refreshed, the user does not lose focus area; and keyboard capabilities are enhanced. Since the events for server processing is queue, there is no perceived wait for user. Requests for server processing are submitted implicitly. Thus, the user interface allows fast data entry.

Since the workload for the server is reduced, the number of application server computers can be reduced. Since the network traffic is reduced, less network bandwidth is required. In one embodiment, standard web technologies, such as DOM and JavaScript are used for the implementation of client side framework, typically JavaScript programmers can customize it, allowing easy customizability and easy troubleshooting.

Many of the methods of the present invention may be performed with a digital processing system, such as a conventional, general-purpose computer system. Special purpose computers, which are designed or programmed to perform only one function, may also be used.

Figure 7:
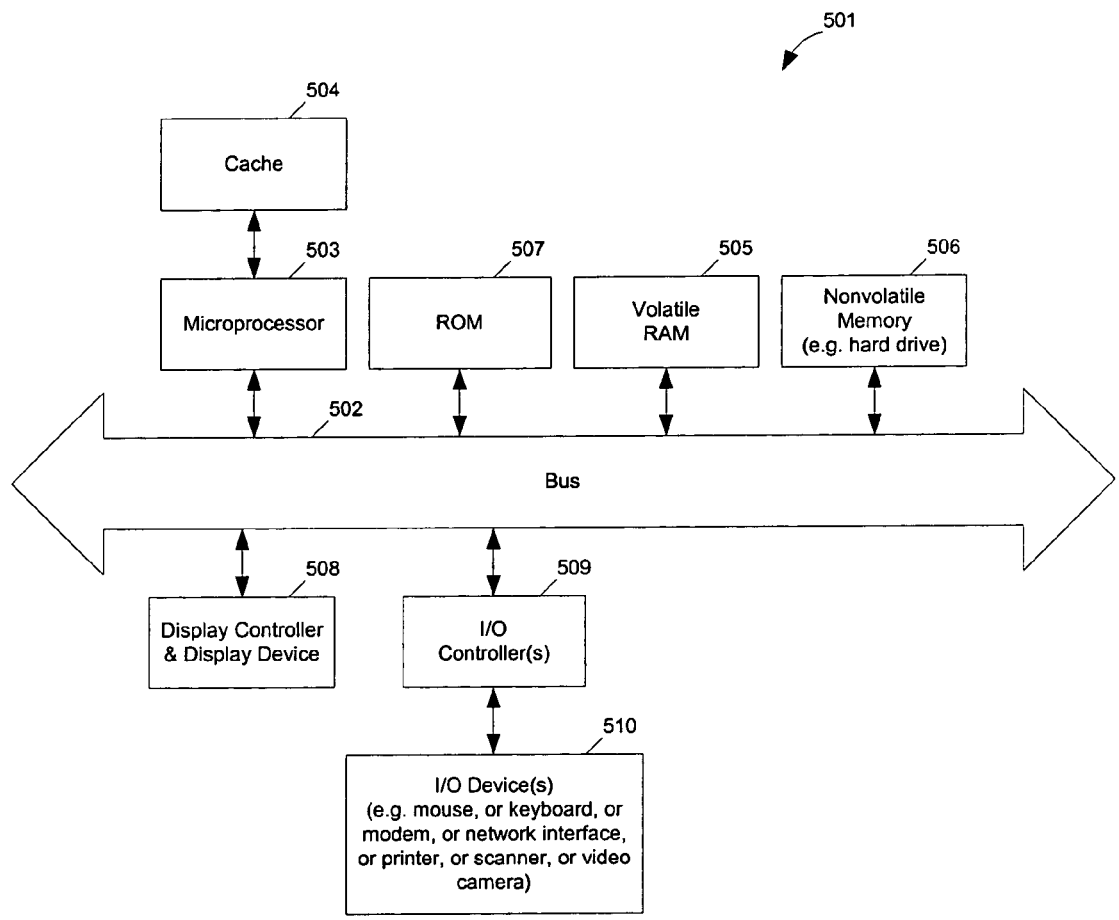
FIG. 7 shows a block diagram example of a data processing system which may be used with the present invention.

FIG. 7 shows one example of a typical computer system which may be used with the present invention. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 7 may, for example, be a server in a server rack, a workstation, or a personal computer (PC), a handhold computer, etc.

As shown in FIG. 7, the computer system 501, which is a form of a data processing system, includes a bus 502 which is coupled to a microprocessor 503 and a ROM 507 and volatile RAM 505 and a non-volatile memory 506.

The microprocessor 503 is coupled to cache memory 504 as shown in the example of FIG. 7. The bus 502 interconnects these various components together and also interconnects these components 503, 507, 505, and 506 to a display controller and display device 508 and to peripheral devices such as input/output (I/O) devices which may be mice, keyboards, modems, network interfaces, printers, scanners, video cameras and other devices which are well known in the art.

Typically, the input/output devices 510 are coupled to the system through input/output controllers 509.

The volatile RAM 505 is typically implemented as dynamic RAM (DRAM) which requires power continually in order to refresh or maintain the data in the memory. The non-volatile memory 506 is typically a magnetic hard drive or a magnetic optical drive or an optical drive or a DVD RAM or other type of memory systems which maintain data even after power is removed from the system. Typically, the non-volatile memory will also be a random access memory although this is not required.

While FIG. 7 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface.

The bus 502 may include one or more buses connected to each other through various bridges, controllers and/or adapters as is well known in the art. In one embodiment the I/O controller 509 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 507, volatile RAM 505, non-volatile memory 506, cache 504 or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In addition, throughout this description, various functions and operations are described as being performed by or caused by software code to simplify description. However, those skilled in the art will recognize what is meant by such expressions is that the functions result from execution of the code by a processor, such as the microprocessor 503.

A machine readable medium can be used to store software and data which when executed by a data processing system causes the system to perform various methods of the present invention. This executable software and data may be stored in various places including for example ROM 507, volatile RAM 505, non-volatile memory 506 and/or cache 504 as shown in FIG. 7. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
receiving, at a client communication manager on a client system, a data update from a document data processor on a server system, wherein the data update specifies a data item to be collected by a user interface, and the user interface provides user access to an application on the server system;
generating, by a user interface rendering engine on the client system, a modification to be made to the user interface, wherein the modification is based on the data update, before the generating the modification, the user interface does not comprise a first user interface element that is required to collect the data item, and the modification is configured to implement the first user interface element in the user interface;
modifying, by the user interface rendering engine, a web document in a web browser to add the first user interface element to the user interface according to the modification, wherein the web document is configured to represent the user interface by virtue of being configured to be rendered in the web browser, and the modifying the web document results in the user interface comprising the first user interface element;
receiving a modification request at the user interface rendering engine directly from a custom module via an Application Program Interface (API), wherein the custom module comprises a custom script program, the custom script program is configured to run in the web browser on the client system, and
the custom module is configured to customize the user interface;
determining, by the user interface rendering engine, a second modification to be made to the user interface, based on the modification request; and
modifying by the user interface rendering engine, the web document to change the user interface according to the second modification.

2. The method of claim 1, wherein the web document is modified without refreshing the entire web document.

3. The method of claim 1, wherein the web document is modified in the web browser through an implementation of a Document Object Model (DOM implementation), and a script program running in the web browser modifies the web document using the DOM implementation.

4. The method of claim 1, wherein the user interface receives user input to configure a service or product.

5. The method of claim 1, further comprising:
receiving a first user input entered into the user interface, wherein the first user input comprises first user data;
determining increment data from a data cache updated with the first user data, wherein the increment data comprises a difference between the first user data in the data cache and user data previously sent from the client to the server system; and
dispatching the increment data to the server system.

6. The method of claim 1, further comprising placing a first user input event in an event queue, wherein the first user input event is received from the web browser for the web document;
receiving one or more further user input events from the web browser for the web document while the first user event is in the event queue; and dispatching the first user input event from the event queue to the server system for processing, wherein the data update is received from the server system in response to the dispatching.

7. The method of claim 1, further comprising modifying, in the web browser, the web document to further change the user interface according to requests received from the API, wherein the API is at the user interface level.

8. The method of claim 1, wherein the user interface comprises a second user interface element, and the user interface rendering engine modifies the web document to remove the second user interface element from the user interface, in response to the data update.

9. A method comprising:
receiving, at a client communication manager on a client system, a first user input event entered into a user interface, wherein the first user input event requires a data item to be collected by the user interface, and the user interface provides user access to an application on a server system;
determining, by a user interface rendering engine on the client system, a modification to be made to the user interface, wherein the modification is based on the first user input event, before the determining the modification, the user interface does not comprise a first user interface element that is required to collect the data item, and
the modification is configured to implement the first user interface element in the user interface;
modifying, by the user interface rendering engine, a web document in a web browser to add the first user interface element to the user interface according to the modification, wherein the web document is configured to represent the user interface by virtue of being configured to be rendered in the web browser, and
the modifying the web document results in the user interface comprising the first user interface element;
receiving a modification request at the user interface rendering engine directly from a custom module via an Application Program Interface (API), wherein the custom module comprises a custom script program, the custom script program is configured to run in the web browser on the client system, and
the custom module is configured to customize the user interface;
determining, by the user interface rendering engine, a second modification to be made to the user interface, based on the modification request; and
modifying by the user interface rendering engine, the web document to change the user interface according to the second modification.

10. The method of claim 9, further comprising:
placing the first user input event in an event queue;
receiving one or more further user input events while the first user input event is in the event queue; and
dispatching the first user input event from the event queue to the server system for processing.

11. The method of claim 10, further comprising:
responsive to a temporary inability to perform the dispatching, performing client-side processing on one of the one or more further user input events, wherein the client side processing further comprises further modifying the web document, wherein the further modifying is performed according to the one of the one or more further user input events, the further modifying is performed using a document object model, and the further modifying is performed in the web browser.

12. The method of claim 10, wherein the web document is modified through an implementation of a Document Object Model (DOM).

13. The method of claim 10, wherein the first user input event comprises a plurality of options values used to configure a service or product.

14. The method of claim 10, wherein the web document comprises an order form.

15. The method of claim 9, wherein an external application is configured to communicate with the user interface rendering engine, wherein the external application sends user interface modifications to the user interface rendering engine using the API.

16. A non-transitory machine readable storage medium containing executable computer program instructions which, when executed by a digital processing system, cause said system to perform a method, comprising:
receiving, at a client communication manager on a client system, a data update from a document data processor on a server system, wherein the data update specifies a data item to be collected by a user interface, and the user interface provides user access to an application on the server system;
generating, by a user interface rendering engine on the client system, a modification to be made to the user interface, wherein the modification is based on the data update, before the generating the modification, the user interface does not comprise a first user interface element that is required to collect the data item, and the modification is configured to implement the first user interface element in the user interface;
modifying, by the user interface rendering engine in a web browser, a web document to add the first user interface element to the user interface according to the modification, wherein the web document is configured to represent the user interface by virtue of being configured to be rendered in the web browser, and the modifying the web document results in the user interface comprising the first user interface element;
receiving a modification request at the user interface rendering engine directly from a custom module via an Application Program Interface (API), wherein the custom module comprises a custom script program, the custom script program is configured to run in the web browser on the client system, and
the custom module is configured to customize the user interface;
determining, by the user interface rendering engine, a second modification to be made to the user interface, based on the modification request; and
modifying by the user interface rendering engine, the web document to change the user interface according to the second modification.

17. The non-transitory machine readable storage medium of claim 16, wherein the method further comprises:
receiving a first user input entered into the user interface; and
dispatching the first user input to the server system, wherein the data update is received from the server system, in response to the dispatching.

18. The non-transitory machine readable storage medium of claim 17, wherein the first user input is inputted by a user into a first field of the user interface, and
the first user input is implicitly committed to a database by dispatching the first user input to the server system when the user leaves the first field.

19. The non-transitory machine readable storage medium of claim 16, wherein the method further comprises:
- receiving a first user input entered into the user interface, wherein the first user input comprises first user data;
- determining increment data from a data cache updated with the first user data, wherein the increment data comprises a difference between the first user data in the data cache and user data previously dispatched to the server system; and
- dispatching the increment data to the server system.

* * * * *